(No Model.)
E. HILL.
APPARATUS FOR DYNAMIC REFRIGERATION.
No. 515,585. Patented Feb. 27, 1894.
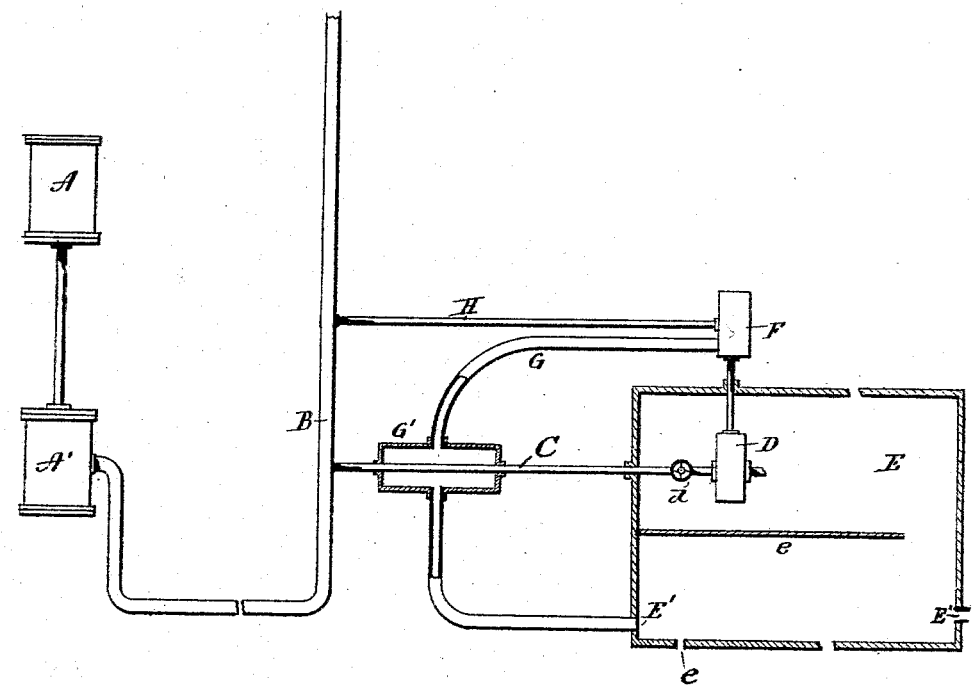

UNITED STATES PATENT OFFICE.

EBENEZER HILL, OF SOUTH NORWALK, CONNECTICUT.

APPARATUS FOR DYNAMIC REFRIGERATION.

SPECIFICATION forming part of Letters Patent No. 515,585, dated February 27, 1894.

Application filed April 18, 1892. Serial No. 429,625. (No model.)

*To all whom it may concern:*

Be it known that I, EBENEZER HILL, of South Norwalk, in the county of Fairfield and State of Connecticut, have invented a new Improvement in Apparatus for Dynamic Refrigeration; and I do hereby declare the following, when taken in connection with accompanying drawing and the letters of reference marked thereon, to be a full, clear, and exact description of the same, and which said drawing constitutes part of this specification, and represents a plan view in the nature of a diagram of a plant for dynamic refrigeration of air under my invention.

My invention relates to an improvement in apparatus for dynamic refrigeration, the objects being to simplify apparatus of this character, and to reduce the cost of operating it to the minimum by recovering much of the power that is now lost in similar apparatus, and by employing a construction which does not require attendance.

With these ends in view, my invention consists in the combination with a primary air-compressor, and a conduit-system connected therewith for conveying the air compressed thereby away for use; of an expanding engine connected with the said system to take compressed air therefrom, a chill-room receiving the exhaust from the said engine, a secondary compressor connected with and driven by the said engine, and connection between the said secondary compressor and the said system for taking the air of secondary compression thereto, and opening into the same at a point so remote from the point where the expanding engine takes air therefrom that the air of secondary compression is cooled by radiation, and by dilution with the cooler compressed air in the conduit system, and reduced to the temperature thereof before it is again used for refrigeration.

My invention further consists in certain details of construction and combinations of parts as will be hereinafter described and pointed out in the claims.

In carrying out my invention I locate what I term the primary air-compressor at a central station. This air-compressor may be of any suitable construction, and is indicated in the drawing by a steam-cylinder A, and an air-cylinder A'. A conduit system leads from the said central-station through the streets of a city, or through the passages of a plant or store-house, according to the circumstances under which the compressed air is to be used. This conduit system will, of course, take its character from the circumstances of the use of the apparatus. Thus, it may consist of a long single main, tapped at intervals for conducting portions of the compressed air flowing through it, to chill-rooms, or it may consist of an arrangement of mains and branches. But, however composed, compressed air will always flow through the system except at the ends of its pipes, which may be called "dead ends." I may here remark that I consider any pipe, whether a trunk or a branch pipe, that has air flowing through it, to be a main pipe within the meaning of my invention. As herein shown the conduit system is represented by a simple trunk pipe B. A small pipe C, leads from the said pipe B, to an expanding engine D, which, as shown, is located within a chill-room E, and exhausts thereinto, the said room having one or more partitions e, which give direction to the air flowing into it.

It may be here mentioned that it is well known that in order to secure in the highest degree the refrigerating action of compressed air, it must, when it is expanded, be expanded in doing outside mechanical work. In view of that fact, I connect the engine D, with a secondary air-compressor F, to which air is supplied, for compression, through a small conduit G, which leads to it from the outlet E', formed in the chill-room, for air being continuously exhausted into the chill-room during the operation of the expanding engine D, some outlet must be made for the surplus air. In this conduit G, I locate a cooler consisting of a cooling-chamber G', which incloses a portion of the pipe C, so that the cold air on its way from the chill-room to the secondary compressor F, gives up a part of its cold to the compressed air coming in from the main B, to the expanding engine, whereby the temperature of the air entering the same is reduced, on the same principle employed in regenerating furnaces which provide for utilizing the heat of the escaping gases, whereas I provide for saving the cold which has been produced by the expenditure of heat and power.

The chill-room E, I may mention, will be of ordinary construction, and preferably will have a door for access to it, and a window for light, neither the door nor window being shown in the drawing. Preferably also it will have an overflow opening, indicated in the drawing by $e'$. To prevent indrafts this opening will ordinarily be covered with a little valve opening outward, and made of very light material, such as a piece of cloth. Such valves are well known, and therefore none has been illustrated. The air introduced by the exhaust of the expanding engine D in excess of the air which is taken out of the chill-room by the secondary air-compressor F, escapes from the chill-room through the overflow opening $e'$, and through the window and door chinks, and through the door whenever the same is opened for access to the chill-room, so that the pressure within the same will not be above the pressure of the atmosphere, or at least above a predetermined pressure within which the apparatus will be operative. I might add that the space which would ordinarily be left around the piston-rod extending from the expanding engine D, to the secondary air-compressor F, would doubtless let enough air escape to prevent any accumulation of pressure in the chill-room. The air compressed in the secondary compressor F, is led by a conduit H, to the main B, which it enters at a point beyond the point at which the expanding engine D, takes its air therefrom. The compressed air entering the main B, from the pipe H, will, owing to its recent compression, be higher in temperature than the air flowing through the main, but it mixes therewith at once, and is soon reduced to the natural temperature of the main, and of the surrounding earth, in case the main is buried, so that the heat generated in the compression of the air in the compressor F, does not practically affect the temperature of the air in the main by the time the same has reached the point where the main is again tapped to supply another expanding engine. As shown, the air of secondary compression is led into the main at a point therein beyond the pipe C, but if desired it may be led into the main at a point in advance of the said pipe C, though I prefer to make the said connection beyond the point where the main is tapped for refrigeration. The air of secondary compression is thus cooled by radiation and dilution.

All of the instrumentalities which I have mentioned may be of any approved construction, and all of them are so well known that it seems unnecessary to go into any detailed description of them. The primary compressor being in operation it is only necessary in order to start the apparatus, to open the valve $d$, permitting compressed air to flow into the expanding engine, which will at once start, and operate the secondary compressor F, which, therefore, in a measure pays back to the main something of the air which it has received. Of course as much air as was taken cannot be returned and the difference represents the cost of the refrigeration, and the friction of the machinery. It will of course be understood that any number of chill-rooms practically corresponding to that shown, may be connected with the main B, within the capacity thereof of supplying compressed air to them.

Although by preference I use the overflowing cold air from the chill-room for feeding to the secondary compressor for compression thereby, I am not obliged to do so, but the said compressor may be fed if preferred by air at ordinary temperatures.

The apparatus herein described is an improvement on that set forth in United States Patent No. 244,601, granted to me July 19, 1881, and showing the use of a special cooler for cooling the air of secondary compression, which is used over and over in the same expanding engine, while my present invention dispenses with such cooler and contemplates cooling the air of secondary compression by radiation and dilution with a body of cooler compressed air in a main connected with the primary air-compressor. My patent above referred to does not contemplate the return of any air to a compressed-air main for conducting it away from the system. In my present application therefor, the air is not used over and over in the same engine, at least not until after intermediate incorporation with other air and diffusion.

I am also aware that it is old to take a refrigerant from a main, use it and return it thereto at a point beyond the point where it was taken therefrom. I do not therefore broadly claim an apparatus in which the process above described may be carried on.

Having fully described my invention, what I claim as new, and desire to secure by Letters Patent, is—

1. The combination with a primary air-compressor and a conduit system connected therewith for conveying the air compressed thereby away for use, of an expanding engine connected with the said system to take compressed air therefrom, a chill-room receiving the exhaust from the said engine, a secondary compressor connected with and driven by the said engine, and connection between the said secondary compressor and the said system for taking the air of secondary compression thereto, and opening into the same at a point so remote from the point where the expanding engine takes air therefrom that the air of secondary compression is cooled by radiation, and by dilution with the air flowing through the system, substantially as described.

2. The combination with a primary air-compressor and a conduit system connected therewith for conveying the air compressed thereby away for use, of an expanding engine connected with the said system to take compressed air therefrom, a chill-room receiving the exhaust from the said engine, a secondary compressor connected with and driven by the said engine, a conduit leading from the chill-room to the secondary compressor which is thus supplied with cold air, and connection between the said secondary compressor and the said system for taking the air of secondary compression thereto and opening into the same at a point so remote from a point where the expanding engine takes air therefrom that the air of secondary compression is cooled by radiation, and by dilution with the air flowing through the system, substantially as described.

3. The combination with a primary air-compressor and a conduit system connected therewith for conveying the air compressed thereby away for use, of an expanding engine connected with the said system to take compressed air therefrom, a chill-room receiving the exhaust from the said engine, a secondary compressor connected with and driven by the said engine, a conduit leading from the chill-room to the secondary compressor to supply air thereto, and including a cooler constructed to apply the cold air from the chill-room to the pipe leading from the said conduit system to the said expanding engine, whereby the air fed to the said engine is cooled by the cold air from the chill-room and connection between the said secondary compressor and the said system for taking the air of secondary compression thereto and opening into the same at a point so remote from a point where the expanding engine takes air therefrom that the air of secondary compression is cooled by radiation, and by dilution with the air flowing through the system, substantially as described.

In testimony whereof I have signed this specification in the presence of two subscribing witnesses.

EBENEZER HILL.

Witnesses:
LEONARD D. WILDMAN,
GEORGE F. BEARSE.